United States Patent [19]

von Stein et al.

[11] Patent Number: 4,951,084
[45] Date of Patent: Aug. 21, 1990

[54] PHOTOGRAPHIC COLOR COPYING APPARATUS AND EXPOSURE CONTROL PROCESS

[75] Inventors: Werner R. von Stein, Hamburg, Fed. Rep. of Germany; Walter Kraft, Zurich, Switzerland

[73] Assignee: Ciba-Geigy Corporation, Ardsley, N.Y.

[21] Appl. No.: 257,927

[22] Filed: Oct. 14, 1988

[30] Foreign Application Priority Data

Oct. 15, 1987 [DE] Fed. Rep. of Germany ....... 3734911
Sep. 12, 1988 [CH] Switzerland ..................... 3394/88-2

[51] Int. Cl.$^5$ ............................................ G03B 27/80
[52] U.S. Cl. ........................................ 355/38; 355/77
[58] Field of Search ....................... 355/32, 35, 38, 68, 355/69, 77

[56] References Cited

U.S. PATENT DOCUMENTS

| | | | |
|---|---|---|---|
| 3,369,449 | 2/1968 | Klauss et al. | 355/40 |
| 3,542,471 | 11/1970 | Dubny | 355/75 |
| 3,942,154 | 3/1976 | Akami et al. | 340/146.3 B |
| 4,092,067 | 5/1978 | Grossman | 355/77 |
| 4,101,216 | 7/1978 | Grossman | 355/35 |
| 4,166,588 | 9/1979 | Krehbiel et al. | 355/72 X |
| 4,270,861 | 6/1981 | Beckman | 355/38 |
| 4,279,505 | 7/1981 | Ursprung et al. | 355/77 |
| 4,344,708 | 8/1982 | Tokuda | 355/35 X |
| 4,416,539 | 11/1983 | Terashita | 355/77 |
| 4,566,786 | 1/1986 | Fursich et al. | 355/77 |
| 4,668,082 | 5/1987 | Terashita et al. | 355/38 X |
| 4,676,628 | 6/1987 | Asbury, III | 355/38 |
| 4,709,259 | 11/1987 | Suzuki | 354/48 |
| 4,757,351 | 7/1988 | Birgmeir | 355/38 |
| 4,779,987 | 10/1988 | Umemoto et al. | 355/38 X |

FOREIGN PATENT DOCUMENTS

| | | |
|---|---|---|
| 0103583 | 6/1985 | European Pat. Off. . |
| 1916989 | 11/1969 | Fed. Rep. of Germany . |
| 1597066 | 4/1970 | Fed. Rep. of Germany . |
| 2632715 | 1/1978 | Fed. Rep. of Germany . |
| 2652287 | 2/1979 | Fed. Rep. of Germany . |
| 3543076 | 6/1985 | Fed. Rep. of Germany . |
| 3408765 | 9/1985 | Fed. Rep. of Germany . |
| 2654943 | 10/1985 | Fed. Rep. of Germany . |
| 3604964 | 8/1986 | Fed. Rep. of Germany . |
| 3615342 | 11/1986 | Fed. Rep. of Germany . |
| 3737775 | 5/1989 | Fed. Rep. of Germany . |
| 57-136639 | 8/1982 | Japan . |
| 1369864 | 10/1974 | United Kingdom . |

OTHER PUBLICATIONS

PCT Publication No. WO83-02869, Watt 8/1983.
Search Report No. 04 848/87.
European Search Report No. 9-16717/17188.

Primary Examiner—Donald A. Griffin
Attorney, Agent, or Firm—Burns, Doane, Swecker & Mathis

[57] ABSTRACT

Originals to be copied are scanned spectral photometrically by regions and from the spectral values obtained thereby, color extract values adapted to the spectral sensitivity variations of the copy material are formed by electronic or computer filtering. The color extract values are then evaluated for the determination of the necessary amounts of copying light. The spectral values are simultaneously used for image analysis and additional control of the exposure. The process avoids expensive optical filters and makes an image analysis which yields a greater amount of information, and thus a more extact determination of the amounts of copying light, possible.

91 Claims, 12 Drawing Sheets

PHOTOGRAPHIC COLOR COPYING APPARATUS AND EXPOSURE CONTROL PROCESS

BACKGROUND OF THE INVENTION

The invention relates to a process and apparatus for controlling the illumination in a photographic color copying apparatus. More specifically, the invention relates to a process and apparatus for controlling the exposure in a photographic color copying apparatus wherein a copy original is photoelectrically scanned by regions such that for each scanned region of the original, color extract values adapted to the spectral sensitivity variation of the copy material are determined. With such a color copying device, the necessary amounts of copying light are determined by comparing the color extract values with corresponding reference values.

A color copying apparatus equipped with a color copying device of this type is known for example from U.S. Pat. No. 4,589,766. In the apparatus described therein, an attempt is made to satisfy the known requirement (see, for example, R.W.G. Hunt, "The Reproduction of Color", p. 284), that the spectral sensitivity (color sequence) of the photoelectric scanning device for the copying apparatus be as close to agreement with that of the copying material as possible, by means of special optical measuring filters. However, this method has the disadvantage that it requires extremely precise, suitable measuring filters, which are very difficult to produce and are correspondingly expensive. In addition, because different, specially adapted measuring filters must always be used whenever changes in the spectral sensitivity of the copying material occur, increased expense is incurred.

A further problem in the determination of the amount of the necessary copying light consists of the fact that the spectral sensitivities of different copying material products differ greatly. The measuring values adapted to the copying material (color extracts, density values, etc.) are therefore subject to very large fluctuations for the same original, depending on the copying material product to which they are adjusted at the time. Obviously, this fact is highly detrimental when, for example, the copy original is to be analyzed relative to color such that skin tones, color neutral areas, color casts, dominants, etc. can be recognized and taken into consideration, as in the case for example of the illumination control process described in U.S. Pat. No. 4,092,067, U.S. Pat. No. 4,101,216 and U.S. Pat. No. 4,279,505, and the Operating Manual, Program 7 and 8 of the Scanning Color Printer 3141 of the present applicant.

SUMMARY OF THE INVENTION

It is an object of the present invention to eliminate these difficulties, and in particular, to determine the color extract values of the copy original without special measuring filters, while still obtaining optimal adaptation of the color extract values to the spectral sensitivity variation of the copy material and making an easy and simple adjustment to changing conditions possible.

It is another object of the invention to overcome the problem of determining the amount of necessary copying light despite the fact that the spectral sensitivities of different copy material products differ greatly.

In accordance with one embodiment of the invention, a process is disclosed for controlling the exposure in a photographic color copying apparatus whereby a copy original is photoelectrically scanned by regions. For every scanned region of the original, color extract values adapted to the spectral sensitivity variation of a copy material are determined and compared with the necessary amounts of copying light. The color extract values are determined by decomposing measuring light which originates in each of the scanning regions of the copy original into a plurality of narrow spectral regions, measuring a spectral value for each spectral region, and evaluating or weighting spectral sensitivity variations of the copy material and integrating or summing the spectral values.

According to another embodiment of the present invention, a photographic color copying apparatus comprises a projection device for reproducing a copy original on a photosensitive copy material. A measuring layout is provided for photoelectrically scanning the original by regions and for determining for every scanning region, color extract values which are adapted to a spectral sensitivity variation of the copy material. Exposure controls cooperate with the measuring layout and the projection device for determining amounts of copying light impacting the copy material. The measuring layout further includes spectrometric means for splitting measuring light which originates in every scanning region of the copy original into a plurality of narrow spectral regions and producing a spectral value for each spectral region. The measuring layout also includes electronic computer means for determining the color extract values upon which the exposure controls are based from the spectral values by evaluating or weighting, respectively, the spectral sensitivity variations of the copy material and by integrating or summing, respectively, the spectral values.

In another embodiment of the invention, a process is disclosed for controlling the exposure in a photographic color copying apparatus whereby a copy original is photoelectrically scanned by individual regions. For each scanning region of the copy original, first color extract values adapted to spectral sensitivity variations of a copy material are determined and compared with appropriate reference values to determine the necessary amounts of copying light. For the individual scanning regions of the copy original, in addition to the first color extract values adapted to the copy material, second, separate color extract values adapted to spectral absorption variations of a copy original material of the copy original are determined. The color composition of the individual scanning regions of the copy original is then analyzed using the second color extract values adapted to the copy original material and in keeping with predetermined criteria. In response to this analysis, any effect of the first color extract values of the scanning regions in the determination of the amounts of copying light is determined.

In yet another embodiment of the invention, a photographic color copying apparatus is disclosed which comprises a projection device for reproducing a copy original on photosensitive copy material. A measuring layout is provided for photoelectrically scanning the original by regions, thereby determining for each scanning region, first color extract values adapted to the spectral sensitivity variations of the copy material. Exposure controls cooperate with the measuring layout and the projection device for determining an amount of copying light impacting the copy material. The measuring layout further includes additional means for determining, in addition to the first color extract values adapted to the copy material, second, separate color extract values adapted to spectral absorption variations of material of the copy original, for the individual scanning regions.

BRIEF DESCRIPTION OF THE DRAWINGS

Other objects and advantages of the present invention will become apparent from the following detailed description of preferred embodiments as described in conjunction with the accompanying drawings in which.

DETAILED DESCRIPTION OF PREFERRED EMBODIMENTS

The color copying apparatus according to the invention may be constructed—with the exception of the differences in the measuring layout for the originals to be explained later—in a manner similar to conventional apparatuses of this type, such as the high capacity printer models Nos. 3139, 3140, 3141 or 3142 of the present applicant, which are in worldwide use and are described in detail among other printer models in U.S. Pat. No. 4,092,067, U.S. Pat. No. 4,101,216, and U.S. Pat. No. 4,279,505. U.S. Pat. No. 4,092,067, U.S. Pat. No. 4,101,216 and U.S. Pat. No. 4,279,505 are hereby incorporated by reference as are the operating manuals of the aforementioned high capacity printers model Nos. 3139, 3140, 3141 and 3142.

Figure 1:
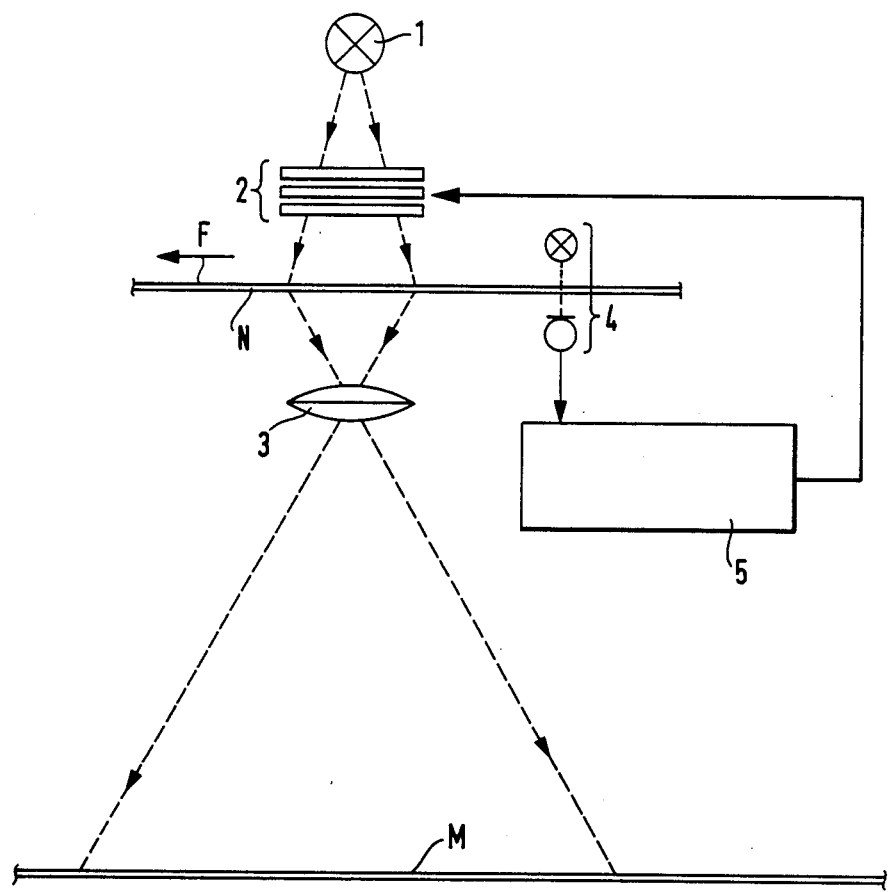
FIG. 1 shows a fundamental schematic diagram of a color copying apparatus according to the invention.

FIG. 1 shows schematically the most essential components necessary for an understanding of the invention of such a color copying apparatus. It comprises a copy light source 1, a set of servo-controlled color shutters 2, imaging optics 3, a photoelectric measuring layout 4 symbolically indicated by a source of measuring light and a photo receiver, and an electronic exposure control 5. The copy original N, exposed to light coming from the copy light source 1, is reproduced by means of the optics 3 on the photosensitive copy material. The amounts of the copying light used for individual partial exposures are determined by the exposure control device 5 on the basis of a preceding regional photoelectric measurement and a measured value analysis of the copy original, and are controlled by means of the color shutters 2.

In the case of the aforementioned high capacity printers, the regional photoelectric measurement of the copy original is carried out with, for example, a resolution of about 100 scanning regions (points) per original. In each of the scanning regions, the three color extract values for the colors of red, blue and green are determined by means of appropriate measuring filters. The color extract values correspond approximately to the sensitivities of the copy materials. These color extract values, 3 times approximately 100 in number, (usually in the form of color density values), are then evaluated in keeping with different criteria to determine the amounts of copying light.

The color copying apparatus according to the invention differs from the known printers primarily in the method by which the color extract values essential for exposure control are obtained. Although scanning is carried out by regions as before, the color extracts are no longer measured directly by means of optical filters. Rather, the measuring light originating in the individual scanning regions of the copy master is spectrometrically decomposed and the color extracts are determined by the electronic (e.g., computer) integration or summation of the spectral values measured, with the spectral values measured being weighted in accordance with the spectral sensitivity variations of the copy material. The color extract values obtained are then evaluated in the conventional manner to control the exposure.

Figure 2:
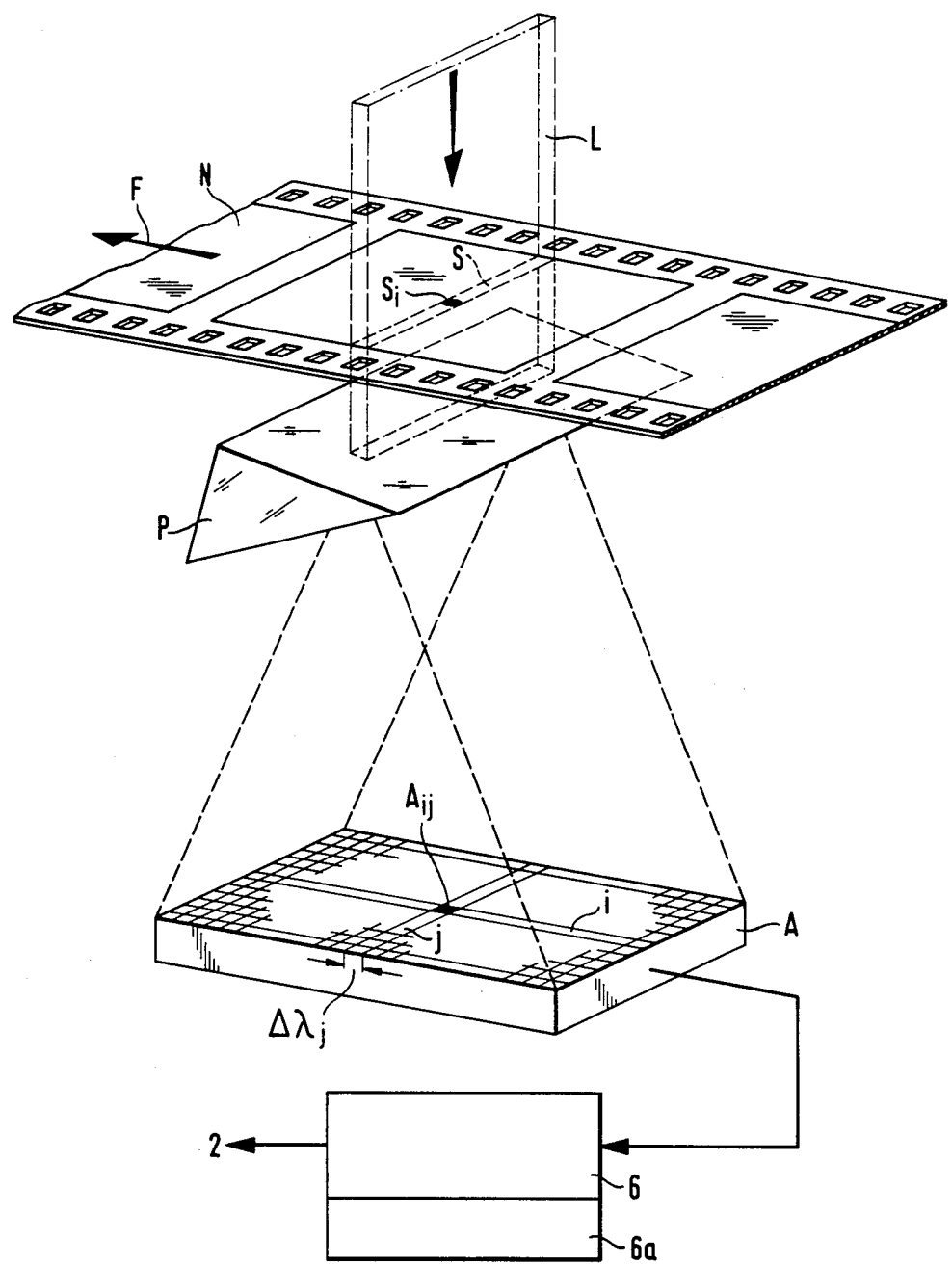
FIG. 2 shows a schematic representation of the measuring layout of the color copying apparatus of FIG. 1; and, FIGS. 3 to 12, represent diagrams illustrating the process of the invention.

FIG. 2 schematically shows a photoelectric measuring layout suitable for these purposes. In FIG. 2, the copy original N, moving stepwise in the direction of the arrow F, is measured by strips, whereby a scanning strip S of the copy original always extends transversely to the direction of advance between two advance steps and is exposed to the measuring light L. The light passing through the copy original N is then spectrally split by means of a prism P extending parallel to the scanning strip S or by means of another suitable element, such as a diffraction grating or a spectral filter. The spectrally split light impacts a two-dimensional field A of photoelectric sensors. (The scanning strip S is reproduced in the process by means of optical elements, not shown, in a known manner on the sensor field A). In this field A, which preferably is in the form of a CCD (charge coupled device) image sensor, the individual photosensors $A_{ij}$ are arranged in parallel rows i and vertical columns j. The columns j extend parallel to the scanning strip S and divide the latter, so to speak, into a plurality of small, essentially point shaped scanning regions $S_i$, wherein every photosensor $A_{ij}$ within a column j receives light only from an (imaginary) scanning region $S_i$. On the other hand, while all of the photosensors $A_{ij}$ located in the row i always receive the light from the same scanning range $S_i$, due to the spectral splitting of the measuring light, they receive it from another wave length range $\Delta\lambda_j$. The rows i thus determine the local resolution in a direction transverse to the direction of advance F of the copy original, while the columns j define the spectral resolution ($\Delta\lambda_j$). The local resolution in the direction of advance is given by the magnitude of the advance steps and is generally chosen to be approximately equal to the resolution in the transverse direction.

The photosensors $A_{ij}$ of a row i therefore always produce, for a certain correlated scanning region $S_i$ of the copy original N, a set of electrical signals corresponding to the spectral transparency of the original in said scanning region. These electrical signals are read, amplified, corrected relative to a dark signal and digitalized in a conventional manner, as described for example in U.S. Pat. No. 4,610,537 and U.S. Pat. No. 4,666,306, both of which are hereby incorporated by reference. These signals are then passed to a computer 6. For reasons of measuring technology (dynamic compression), amplification is preferably logarithmic, so that the digital signals conducted to the computer represent not spectral transmission values, but rather spectral density values of the scanning regions.

Common CCD image sensors contain approximately 500×500 individual photosensors. In this manner theoretically, if local resolution is assumed to be equal in both directions, a division of the copy original into approximately 250,000 scanning regions with a spectral resolution of better than 1 nm is possible. In order to keep costs within acceptable limits, however, correspondingly coarser advance steps and the optional combination of the signals of adjacent photosensors are utilized in actual practice such that resolution is restricted to about 1000-2000 scanning regions per original with a spectral resolution of 5-40 nm, preferably about 10-20 nm. This still yields roughly 9,000-140,000 measured values to be processed per original.

The photoelectric spectral scanning of the original obviously may be carried out by other means also. For example, in place of a two-dimensional field of photosensors, a one-dimensional row of photosensors may also be used, wherein the local division of the original into individual scanning regions can be obtained, for example, by an appropriate point exposure or a scanning motion of the row of photosensors. In an extreme case, it is possible to operate with a single photosensor. However, in view of the large number of the measurements to be carried out in sequence, such operation would be impractical, at least in high velocity printers.

In the computer 6, the spectral density values measured are delogarthmically amplified and thereby yield the measured spectral transmission values which, in contrast to the actual transmission values of the original, also contain the color path of the scanning device (measuring light source +optics). In the following, the measured discrete spectral density values of each of the scanning regions are designated by $D_\lambda$, and the discrete spectral transmission values are designated by $T_\lambda$. The sums of the density values $D_\lambda$ and transmission values $T_\lambda$ are analogously designated by $D(\lambda)$ and $T(\lambda)$.

Figure 3:
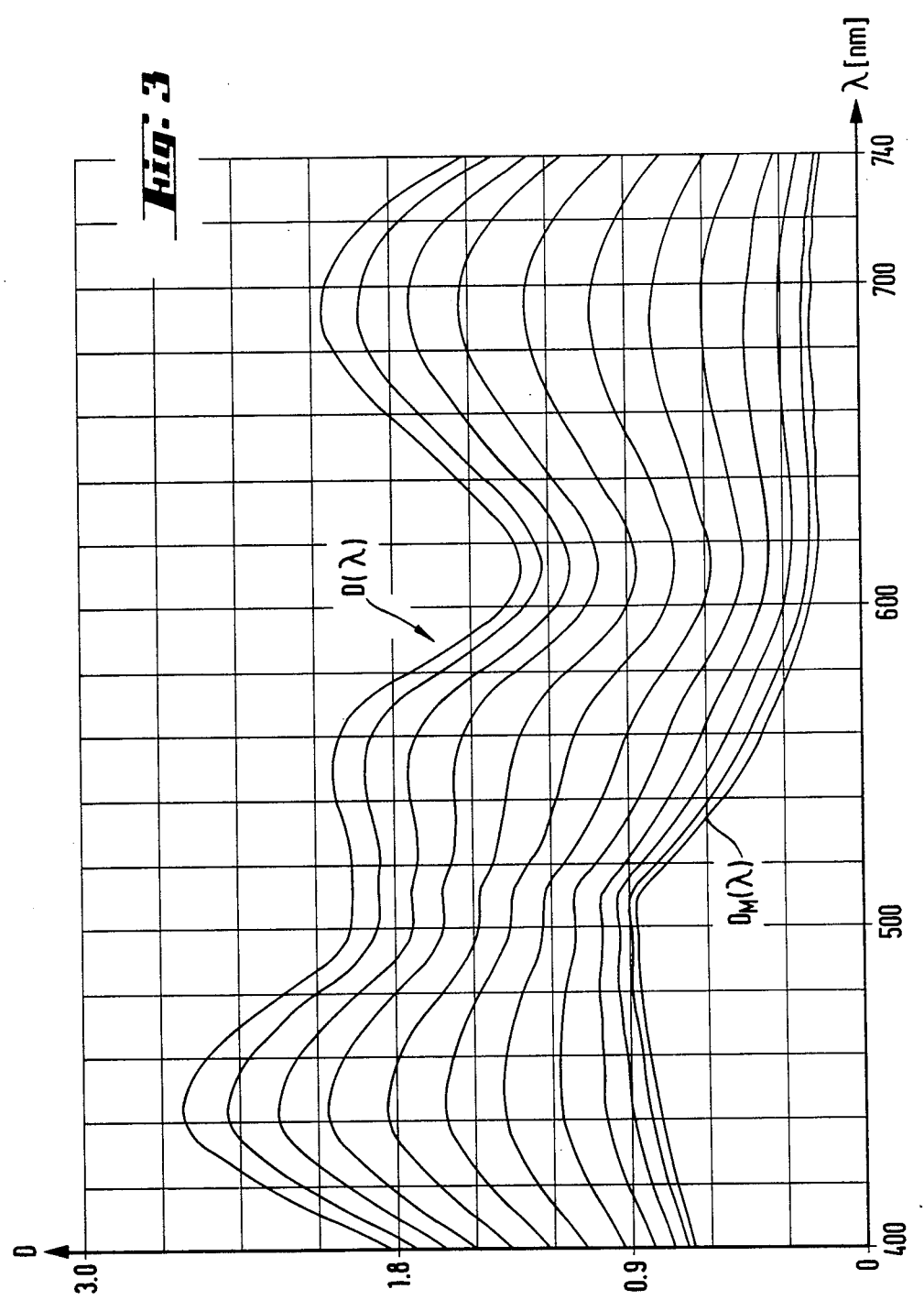
Figure 4:
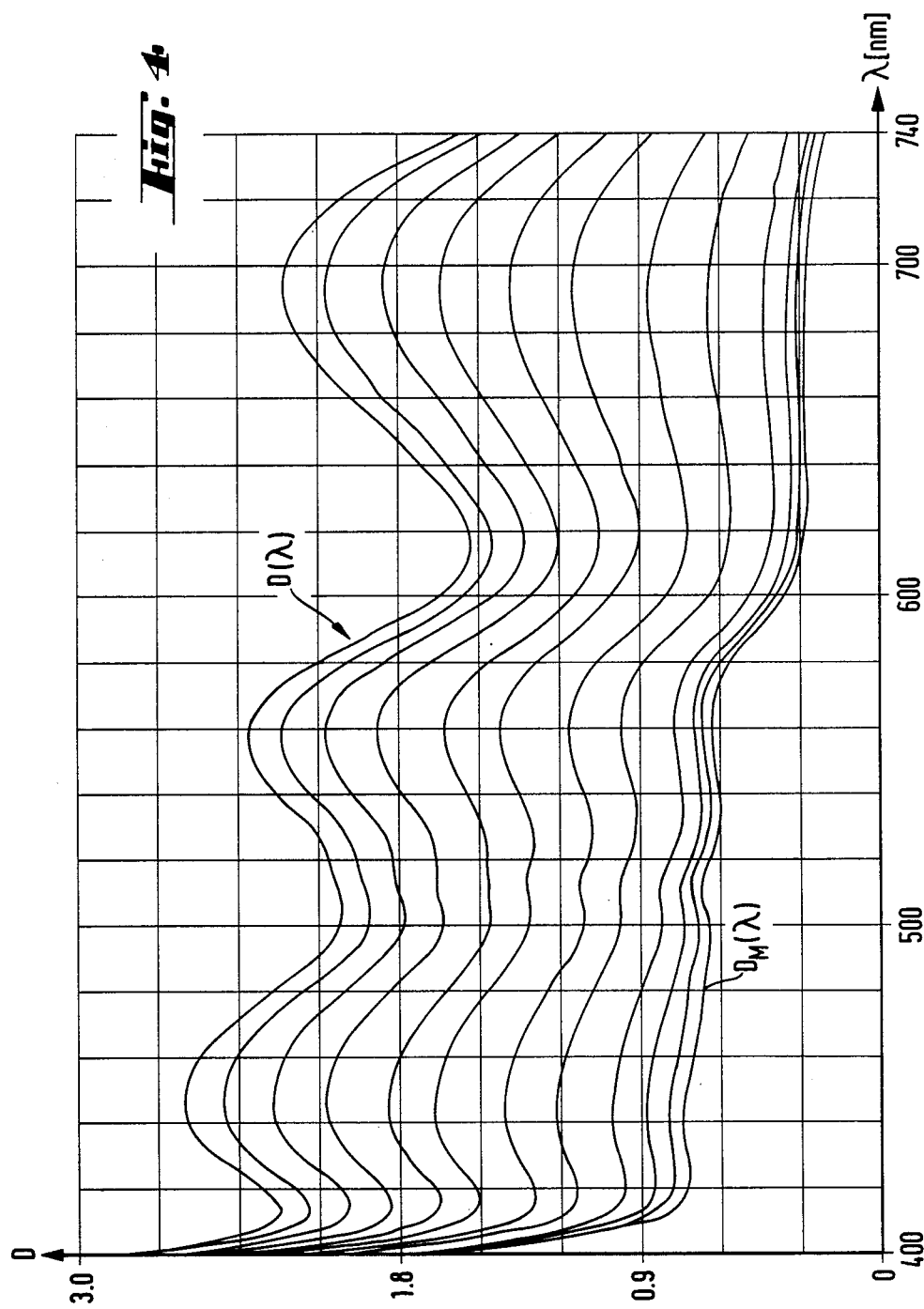

In FIGS. 3 and 4 the measured spectral densities $D(\lambda)$ of two different negative color films are shown. The individual measured spectra correspond to differently exposed originals, taken from a neutral gray color master. The lowest curve represents the existing mask spectrum $D_M(\lambda)$ of the negative color film. The wave length range ($\lambda$ axis) extends from $\lambda_{min}=400$ nm to $\lambda_{max}=740$ nm with a grid of 20 nm. The density values (D axis) extend from 0 to 3 (dimensionless).

Figure 5:
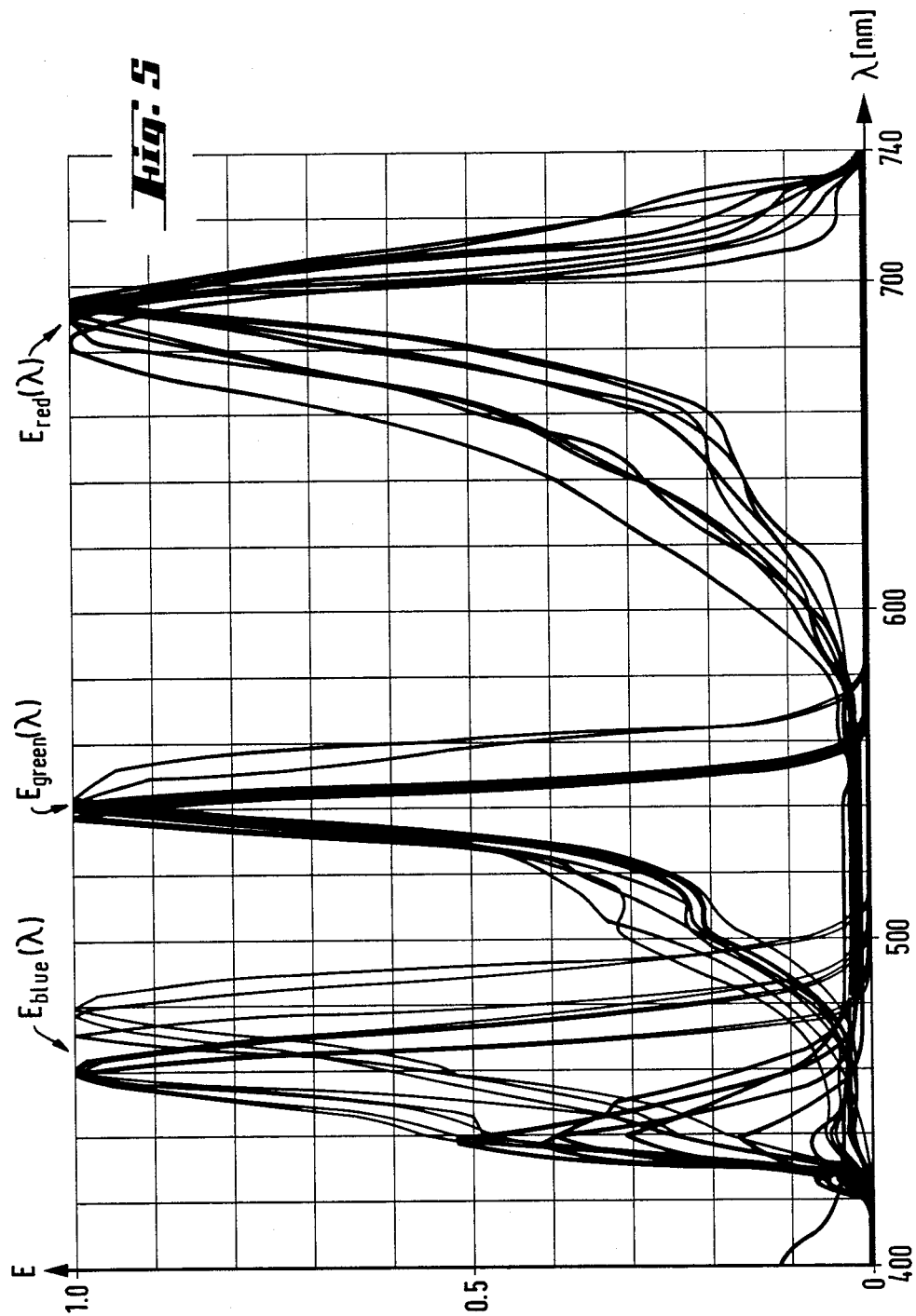

FIG. 5 shows the (standardized) spectral sensitivity variations $E_{blue}(\lambda)$, $E_{green}(\lambda)$ and $E_{red}(\lambda)$ of different copy materials (photographic papers), again in a wave range of 400-700 nm. The sensitivity values (E axis) are between 0 and 1. As seen, the sensitivity variations have steep flanks, which are very difficult to reproduce by means of optical filters.

According to the relevant literature, for example the aforecited U.S. Pat. No. 4,589,766, the light $B_i$ effective in the three light sensitive layers of the copy material is given by the three integrals:

$$B_i = \int_{\lambda_{min}}^{\lambda_{max}} E_i(\lambda) \cdot T^*(\lambda) \cdot I(\lambda) \, d\lambda \; (i = \text{blue, green, red})$$

wherein $E_i(\lambda)$ and $T^*(\lambda)$ signify the spectral sensitivities of the three layers of the copy material and the (actual) spectral transmission of the copy original, respectively. $I(\lambda)$ signifies the color variation of the optical system, and therefore, in particular signifies the spectral intensity variation of the copying light source.

In order to adapt the color variation of the photoelectric scanning layout 4 to the spectral sensitivities $E_i(\lambda)$ of the copy material according to the invention, rather than inserting the appropriate optical filters in the measuring beam path, the individually measured spectral transmission values of every scanning region are weighted with the spectral sensitivity values of the copy material and the color variations of the measuring layouts and projection layout (copy light source + optics).

These values are then integrated or summed over the entire wave length region $\lambda_{min} \ldots \lambda_{max}$, so that the three color extract values $F_i$ (i=blue, green, red) for every scanning region may be calculated by the following formula:

$$F_i = \int_{\lambda_{min}}^{\lambda_{max}} [T(\lambda)]/[Im(\lambda)] \cdot E_i(\lambda) \cdot Ik(\lambda) \cdot d\lambda$$

wherein $T(\lambda)$ and $E_i(\lambda)$ have the significance previously indicated, while $Im(\lambda)$ and $Ik(\lambda)$ are the spectral color variations of the measuring layout and the copying device. The parameters and the measuring values of this formula are present in a discrete form, so that in actual practice the integral becomes the following sum:

$$F_i = \sum_{\lambda=\lambda_{min}}^{\lambda_{max}} T_\lambda \cdot Ik_\lambda/Im_\lambda \cdot E_{i\lambda}$$

The color variation $Im(\lambda)$ of the optical scanning layout may be determined by performing a measurement in the absence of a color original, in a manner analogous to the determination of the color variation $Ik(\lambda)$ of the copying device. The spectral sensitivities $E_i(\lambda)$ of the copy material are either known from data sheets or are determined by known methods. All of the discrete values of $Im(\lambda)$, $Ik(\lambda)$ and $E_i(\lambda)$ are stored in a tabular form in a memory 6a (FIG. 2) cooperating with the computer 6, wherein obviously the three individual values $Ik_\lambda$, $Im_\lambda$ and $E_{i\lambda}$ may also be combined into one or two parameters. Preferably, several sets of copy material sensitivities $E_i(\lambda)$ are stored for different copy materials. Preferably, the color variations $Ik(\lambda)$ and/or $Im(\lambda)$ of the copy apparatus or the scanning device respectively, are redetermined from time to time and the prevailing values stored. For reasons of computing technology, the individual products of the above formula for $F_i$ are advantageously calculated from the (stored or measured) values of log $E_{i\lambda} \cdot D_\lambda$, etc.

The three color extract values $F_{blue}$, $F_{green}$ and $F_{red}$ corresponding to the nature of the prevailing scanning regions are measured with conventional filters. These color extract values are now simply converted logarithmically into the corresponding color densities $D_b$, $D_g$ and $D_r$ (b=blue, g=green, r=red) and then used for example according to U.S. Pat. No. 4,092,067, U.S. Pat. No. 4,101,216 and U.S. Pat. No. 4,279,505, or the aforementioned operational manuals of the high velocity printers of the applicant, to calculate the amounts of copying light, wherein they take the place of the heretofore densitometrically determined density values.

The process according to the invention has been described above relative to copy originals in the form of negatives. It is understood, however, that the process is also appropriate for positive originals wherein in the case of hard copies, the spectral transmission values are replaced with spectral reflection values. Spectral transmission and reflectance values are referred to generally as spectral values.

The valuation (i.e., weighting) of the spectral values with the spectral sensitivities of the copy material is preferably carried out exclusively by computer. Naturally, electronic weighting would also be possible, for example, by regulating the sensitivity of the photoelectric measuring device in a wave length dependent manner. For example, this could be accomplished by the corresponding setting of the prevailing amplification factor during the read-out of the individual photosensors $A_{ij}$ of the CCD image sensor.

Probably the most important aspect of the process according to the invention is that measured values optimally adapted to the spectral sensitivities of the prevailing copy material may be determined from the spectral measurement of the original purely by calculation (or electronically), i.e., without the need of a manually or mechanically controlled exchange of measuring filters. Measuring filters adapted to the copy material, which must satisfy very high requirements concerning the variations of transmission or tolerances and which therefore are relatively expensive, may be entirely eliminated in the process of the invention. This has become even more important recently, as heretofore several such filter sets were necessary, if, as is frequently the case, copy materials of different manufacturers are used. It has further been necessary to recalculate and provide such filters for any copy materials newly coming on the market. These difficulties are eliminated by the present invention, as here the adaptation is effected purely numerically on the basis of stored sensitivity curves. Obviously, any potential spectral differences of the measuring and copying light and of the measuring and exposure beam path which might be present, as well as any spectral sensitivities of the photoelectric sensor used may be taken into account in a very simple manner.

A further essential advantage of the process according to the invention and the spectral measurement on which it is based, is that without any supplemental apparatus, values adapted to the original in addition to measured values adapted to the copy material may also be determined, which, in keeping with a further important aspect of the invention, may also be evaluated for the control of exposure.

Measured values adapted to the copy material and those adapted to the original, serve different purposes. The latter are used in the color analysis of the image content of the copy original (for example the recognition of color neutral items in the object imaged). The exposure parameters based on the former (amounts of copy light) are determined in a manner such that a copy which is optimally free of color casts is obtained (for example, so that a color neutral object appears color neutral in the copy also). Thus, as already mentioned in European Patent Publication 261,074, it is useful in the copying of slides, on the one hand to measure sensitivities adapted to the human eye in order to detect potentially present color errors of the original, and on the other, to use measured values adapted to the copy material for the determination of the amounts of copying light, in order to obtain a reproduction as color true as possible.

In the case of color negatives, a set of measured values adapted to the original makes better color recognition possible (for example, skin color, neutral areas, etc.) and thereby also makes the secure color detection of color dominants possible. Thus, in determining such specific measured values associated with the original, it is found to be advantageous in accordance with a further concept of the invention, for example, to primarily use measured values from spectral regions wherein the spectral absorption of the original colorants (film colorants) yellow, cyan, purple, have their maximum. It is advisable, in keeping with another idea of the invention to standardize the spectral measured values (spectral density values $D_\lambda$) of the individual scanning regions of the original, prior to their processing relative to the spectral density values of the mask of the copy material (i.e. deducting the spectral density values of the mask), so that the original material specific properties of the mask do not affect the object specific measured values. Compared with a measurement which considers only the properties of the copy material and thus may yield for the same original considerably different results as a function of the copy material used, the process according to the invention provides more accurate information of what the original has actually "seen" in the taking of the image.

Figure 6:
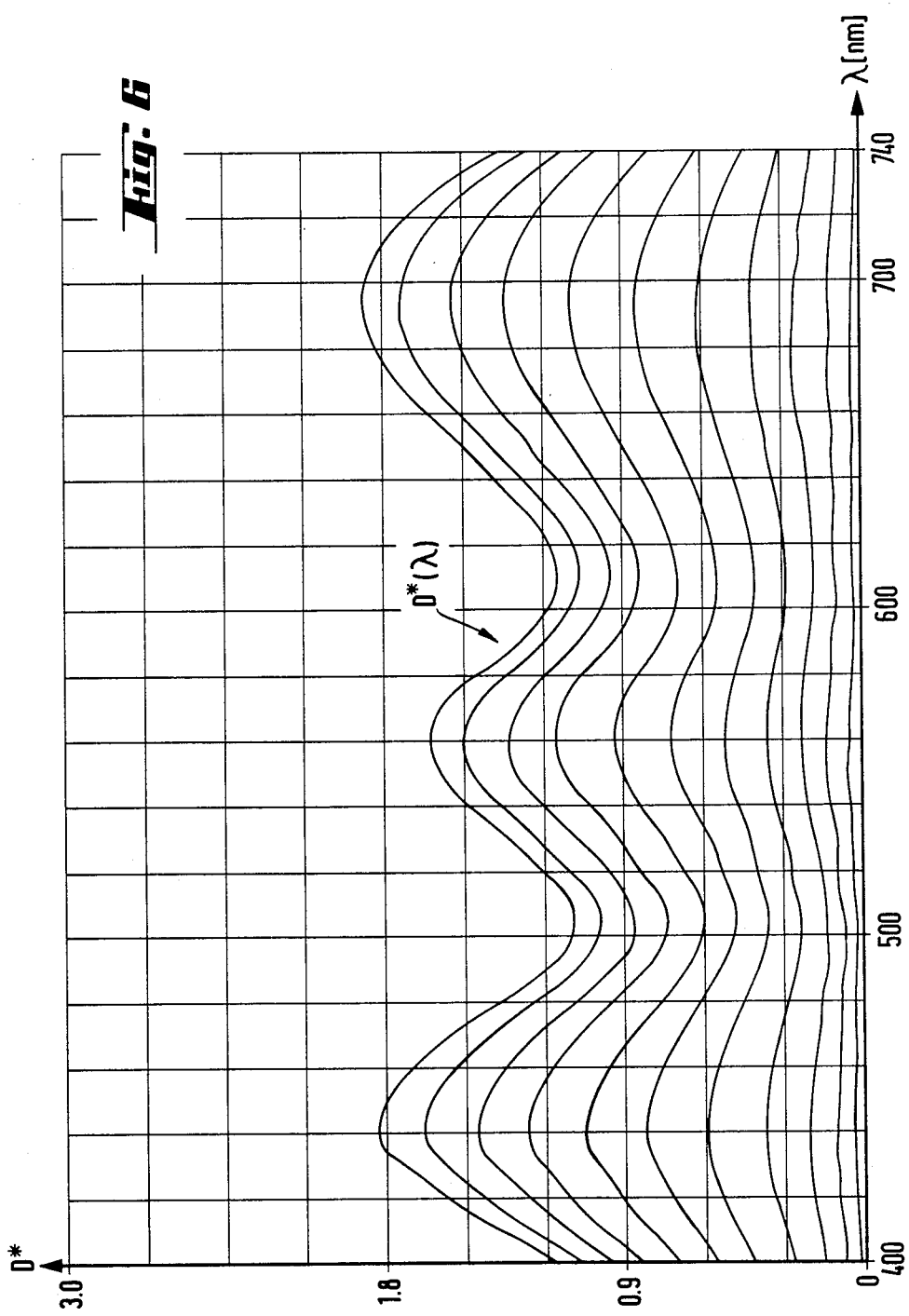
Figure 7:
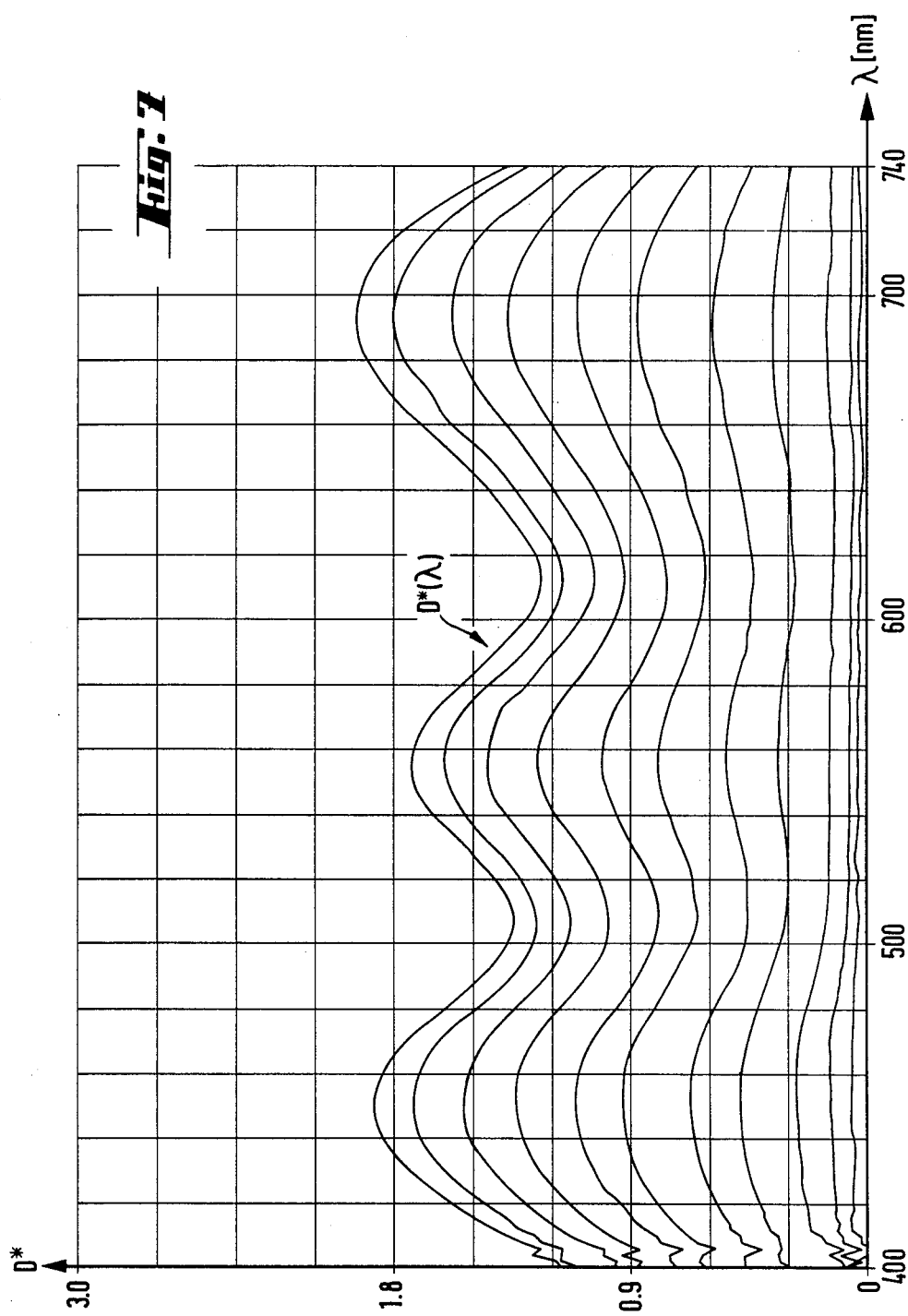

In FIGS. 6 and 7, the density spectra $D^*(\lambda)$ calculated from the density spectra $D(\lambda)$ of FIGS. 3 and 4 as standardized for the prevailing mask spectrum are shown. It is clearly seen that by means of this standardization a significant equalization of the spectra is achieved. The standardized spectra provide more information concerning the image content, as they are less affected by original material specific properties.

For standardization, (i.e. reduction of the measured spectral density values $D_\lambda$ by the prevailing spectral density values $D_{M\lambda}$ of the mask of the original), obviously in addition to or in place of the mask spectrum $D_M(\lambda)$, the mean density spectra (or analogously, transmission spectra) calculated over the scanning region density spectra of a large number of copy originals or of a single suitable test copy original, may also be used.

To determine object specific data, the standardization of scanning region density spectra on the mask density spectrum or an averaged density spectrum is also advantageous if only a single set of measured data adapted to the copy material is used for exposure control.

Figure 8:
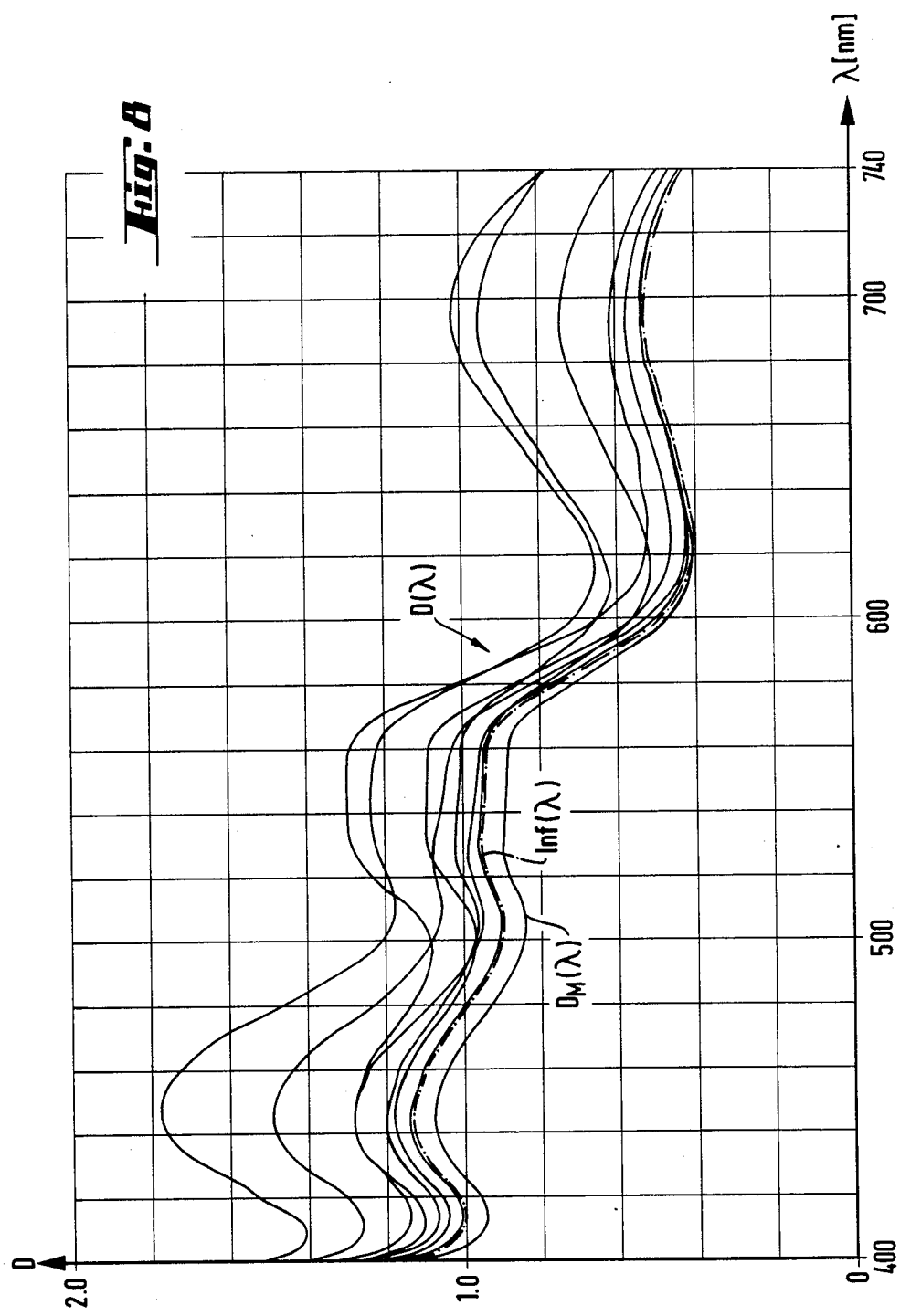

For the determination of the mask spectrum $D_M(\lambda)$ of the copy original, the strips between successive image fields or other unexposed regions of the copy original may be employed. It is also additionally possible to obtain the mask spectrum by estimation, based on a larger number of scanning region (image point) spectra, by determining the minimal measured density (or as an equivalent the maximum transmission) in the different image point spectra for every wave length range. As seen in an example from FIG. 8, the lower envelope curve determined in this manner and indicated by a dot-dash line $Inf(\lambda)$ may agree, even with a few individual spectra $D(\lambda)$, very well with the mask spectrum $D_M(\lambda)$ (lowest curve) measured for comparison.

Based on the spectral values of one, or preferably, several copy originals and preferably on unexposed parts of the original as well, it is entirely possible to carry out an automatic original product recognition. Such a product recognition is advantageous because in this manner a special measuring device for the detection of the usual film codes (DX code) may be eliminated. In particular, it may be used in the case of master formats and products which have no such codes. This makes it additionally possible to detect original products which differ greatly from the standard, and to copy them by means of special correction and exposure parameters.

It is also more advantageous, relative to measuring technology, to determine the true mask density independently of the product. This is because in the process, additional effects are also taken into consideration as the result of the superposition of film material, high storage temperatures, developing errors, etc.

For such product recognitions, originals of different manufacture in part differ greatly from each other both in the spectral variation of mask density and in the position and width of the spectral absorption curves of the three colorants (a recognition process based on different absorption curves is described for example in U.S. Pat. No. 4,422,752). The determination of the spectral mask density $D_M(\lambda)$ has already been explained. An estimate of the spectral variation of the three absorption curves is carried out, for example, on the basis of a larger number of scanning region spectral values by determining the maximally measured density (or in an equivalent manner, the minimum transmission) in the different scanning region spectra for every wave length range. Standardization of the spectral data determined in this manner relative to the original mask spectrum is an advantage here also.

Based on the data determined, a classification of the copy original manufacture may be effected by means of the known methods of pattern and signal detection (see, for example: "Methods of Pattern Detection", Frankfurt/Main, Akad. Verlagsgesellschaft, 1974; Van Trees: "Detection, Estimation and Modulation Theory", New York, Wiley, 1968). Such copy original manufacture detections cannot be carried out with conventional measuring methods or at least not with comparable accuracy. Obviously, the process of the invention described above for the recognizing or distinguishing the manufacture is of advantage in the case of slide copy originals.

As seen in FIG. 5, the spectral sensitivities $E_i(\lambda)$ of the copy material are characterized by relatively steep flanks. Accordingly, these curves must be measured using a relatively high spectral resolution (order of magnitude 1–3 nm, preferably about 2 nm) and stored for the above described further calculations. In comparison, as seen in FIGS. 3 and 4, the spectral density values $D(\lambda)$ of the copy original have a relatively flat configuration. For the spectral measuring of the copy originals therefore, a considerably lower spectral resolution of the order of magnitude of 5–40 nm, preferably about 10–20 nm, is sufficient. This fact may be utilized according to another aspect of the invention to maintain the technical effort required for the spectral measurement of the copy originals relatively low.

Figure 12A:
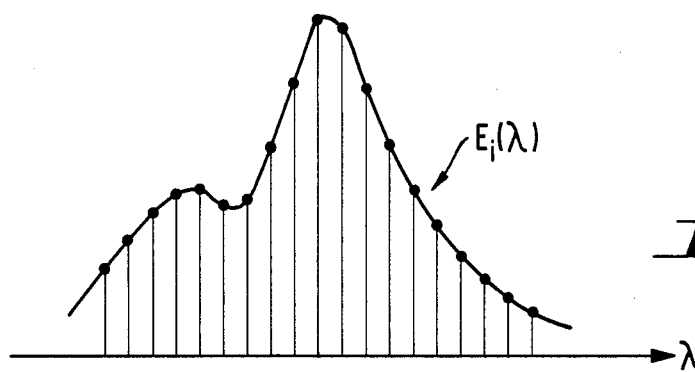
Figure 12B:
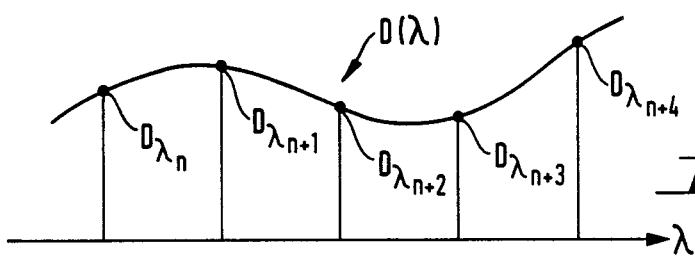
Figure 12C:
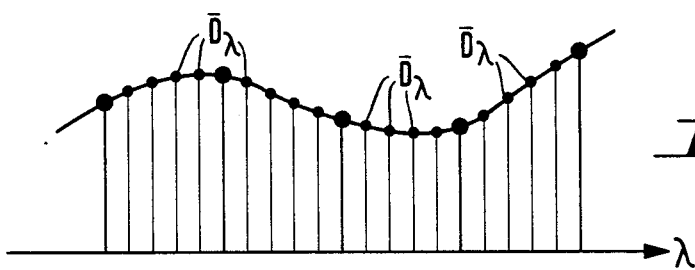
Figure 12D:
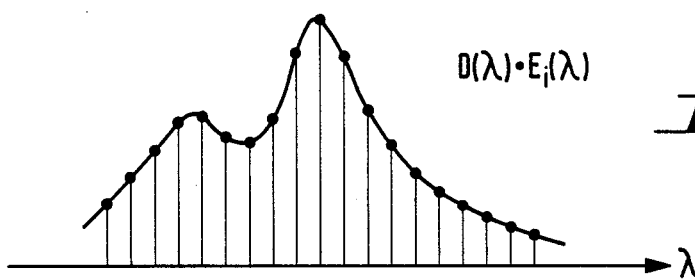

As described above, for the determination of color extracts, a numerical correlation (weighting) between the stored spectral sensitivity variations of the copy material and the measured scanning region spectra of the copy original is required. For this purpose, both sets of data must be present with the same spectral resolution. According to a further important aspect of the invention, from the scanning region spectral values $D_\lambda$(FIG. 12b) measured with a lower resolution, intermediate values $\overline{D}_\lambda$ are calculated (i.e., the support point density is increased, FIG. 12c) by means of a suitable interpolation method such as the cubic spline method so that the measured spectral values $D_\lambda$, together with the interpolated intermediate values $\overline{D}_\lambda$ have the same spectral resolution as the stored sensitivity variations $E_i(\lambda)$ (FIG. 12a). Finally, in FIG. 12d, the result of the correlation of the measured and intermediate values $D_\lambda$ and $\overline{D}_\lambda$ of FIG. 12c with the stored values $E_i(\lambda)$ of FIG. 12a is shown.

As seen in FIG. 5, very large differences exist between the spectral sensitivities of different copy materials. Measuring values (color extracts) adapted to the copy material therefore are subject to large fluctuations for the same copy original, if a change is made from one copy material to another. This fact is obviously highly detrimental if it becomes necessary to color analyze the copy original (detection of skin tones and color neutral areas, detection of exposure color casts, dominants, etc.). Therefore, for the color analysis of copy originals according to a further aspect of the invention, constant measured values adapted not to the copy material sensitivities but to the spectral absorption curves of the copy originals are used. It is advantageous here that the absorption curves of the conventional copy originals have a relatively flat maximum (FIG. 11), the spectral location of which, in addition, varies only a relatively small amount among different products (FIGS. 6 and 7). In this manner, object specific measured values may be determined (extensively) independently of the manufacture of the original, by weighting the spectral density values $D_\lambda$(and the interpolated intermediate values) with narrow band sensitivities (band width about 10 nm), which have their maximum in the vicinity of 450 nm (for the yellow colorant), 550 nm (for the purple colorant) and 695 nm (for the cyan colorant). If these sensitivities are designated $G_i(\lambda)$ (i=yellow, purple, cyan), then copy original measured values $DV_i$ are obtained from the measured (and possibly interpolated) spectral density values $D_\lambda$ and the spectral density values of the mask for every individual scanning region according to the formula:

$$DV_i = \sum_{\lambda_{min}}^{\lambda_{max}} G_{i\lambda} \cdot (D_\lambda - D_{M\lambda}) \ (i = \text{yellow, purple, cyan})$$

According to this particular embodiment of the process of the invention therefore, two sets of data are produced from the measured spectral values for each scanning region of the copy original; i.e., firstly the three color extracts $F_i$ adapted to the copy material and the corresponding color density values $D_i$, and secondly the color density values $DV_i$ adapted to the copy original. The color densities $D_i$ adapted to the copy material are used to control the exposure in a manner such that color neutral original areas yield color neutral copies, while the color densities $DV_i$ adapted to the copy original are utilized to analyze the content of the original and the correction of the exposure based on it. This may be carried out in principle for example, in a manner similar to the process described in U.S. Pat. No. 4,092,067, U.S. Pat. No. 4,101,216 and U.S. Pat. No. 4,279,505 and in the operating manuals of the aforementioned high speed printer of the present applicant, where the measured values (color density values $D_i$) of the individual scanning regions (image points) enter the calculation of the amounts of copying light differently (for example with different weighting), depending on whether the image points concerned have certain properties, for example a color imbalance (dominants), etc., or not. In the known process, the image points are examined in keeping with certain criteria using the same measured values adapted to the copy material, as the measured values employed in the determination of the amounts of copying light. However, in the process of the invention, the calculation is based on measured values specially adapted to the copy original. In other words, the determination of which image points should enter the calculation of the amounts of copying light in what manner, is carried out by means of the color density values $DV_i$ adapted to the copy original, but the determination of the amounts of copying light itself are based on the color extracts $F_i$ adapted to the copy material and the corresponding color densities $D_i$.

The above described principle of the invention, to effect the control of the exposure on the basis of both a data set adapted to the copy material, and a separate data set adapted to the copy original material, is obviously not restricted to the spectral photometric scanning of copy masters, although this measuring method for the abovementioned reasons appears to be the most appropriate and advantageous. Naturally, the two sets of data (the color extracts $F_i$ and corresponding color densities $D_i$ and the separate color extracts and color densities $DV_i$) may also be determined in the conventional manner, for example by suitable optical filtering.

Figure 9:
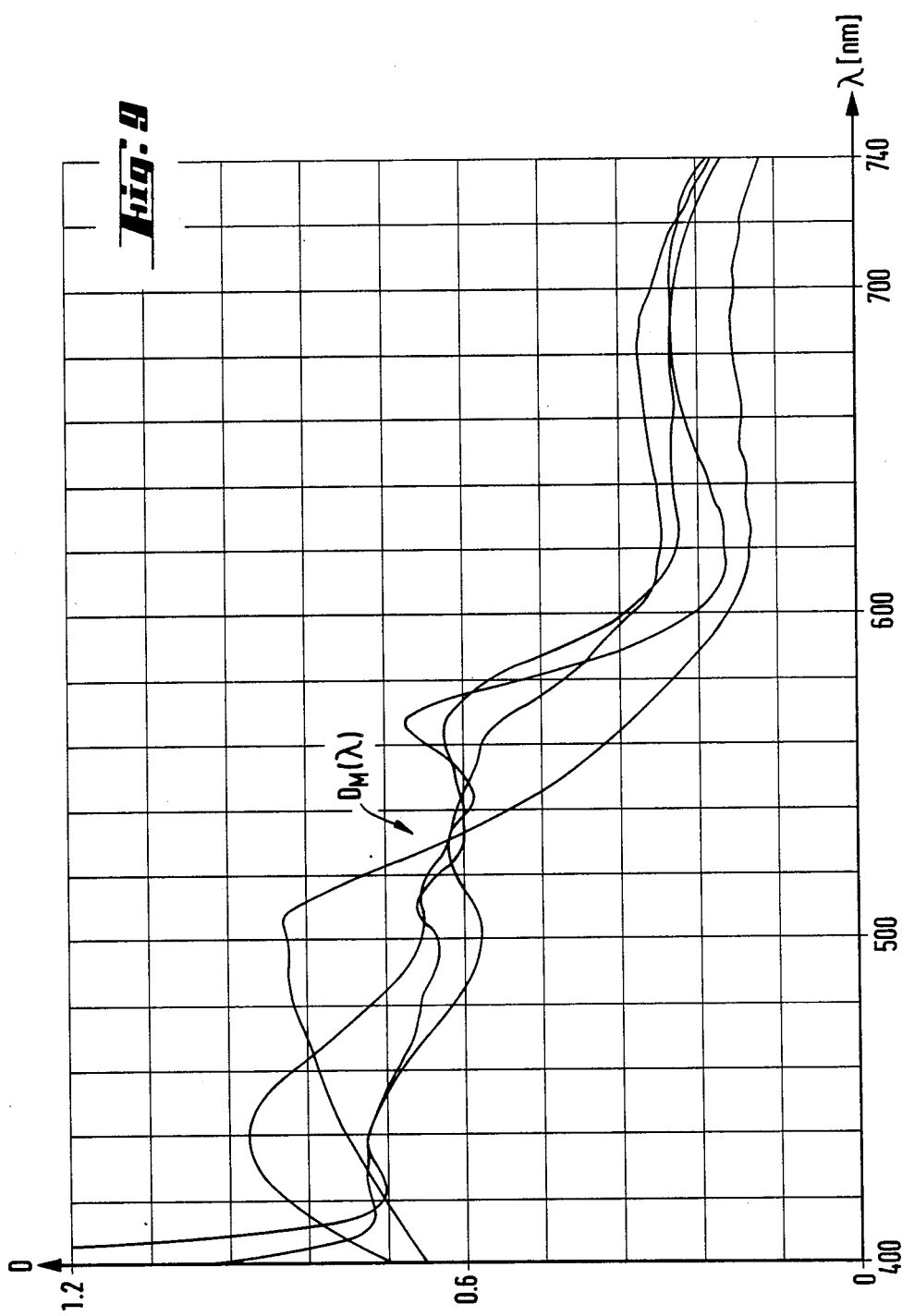

Copy originals which clearly differ in their copying behavior from the average, are also usually characterized by clear differences in their mask spectrum. FIG. 9 shows the (measured) mask (density) spectra $D_M(\lambda)$ of four different copy original products (negative films). It is clearly seen that even with a simple process, a very good distinction or recognition of certain manufactures is possible. Thus for example, for such a recognition, the deviation between stored reference mask spectra and the actual measured (or estimated) mass spectra may be calculated. As suitable additional characteristics, the slopes of the mask spectra at certain wave lengths (for example 400, 530 and 580 nm) may be used.

Figure 10:
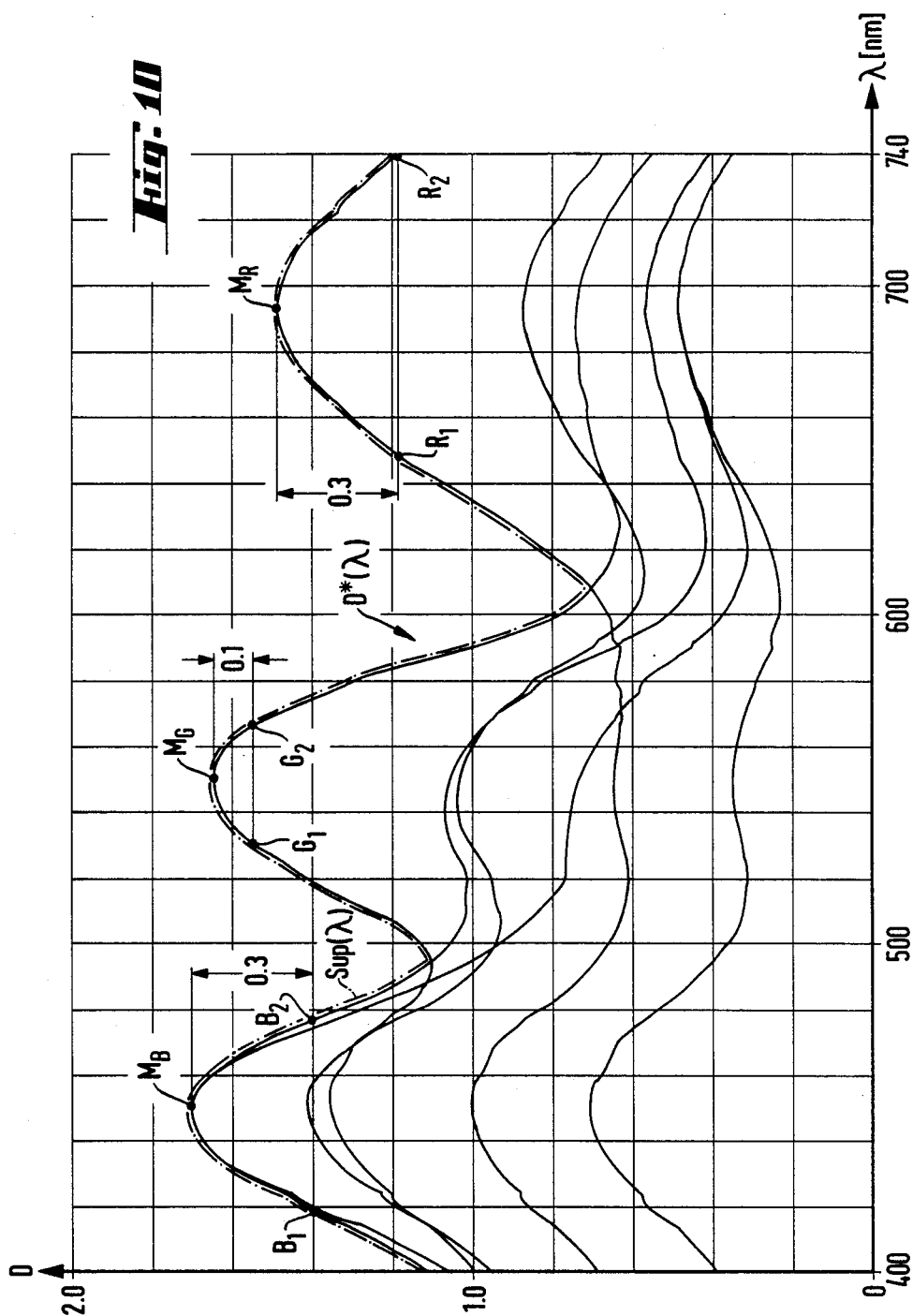
Figure 11:
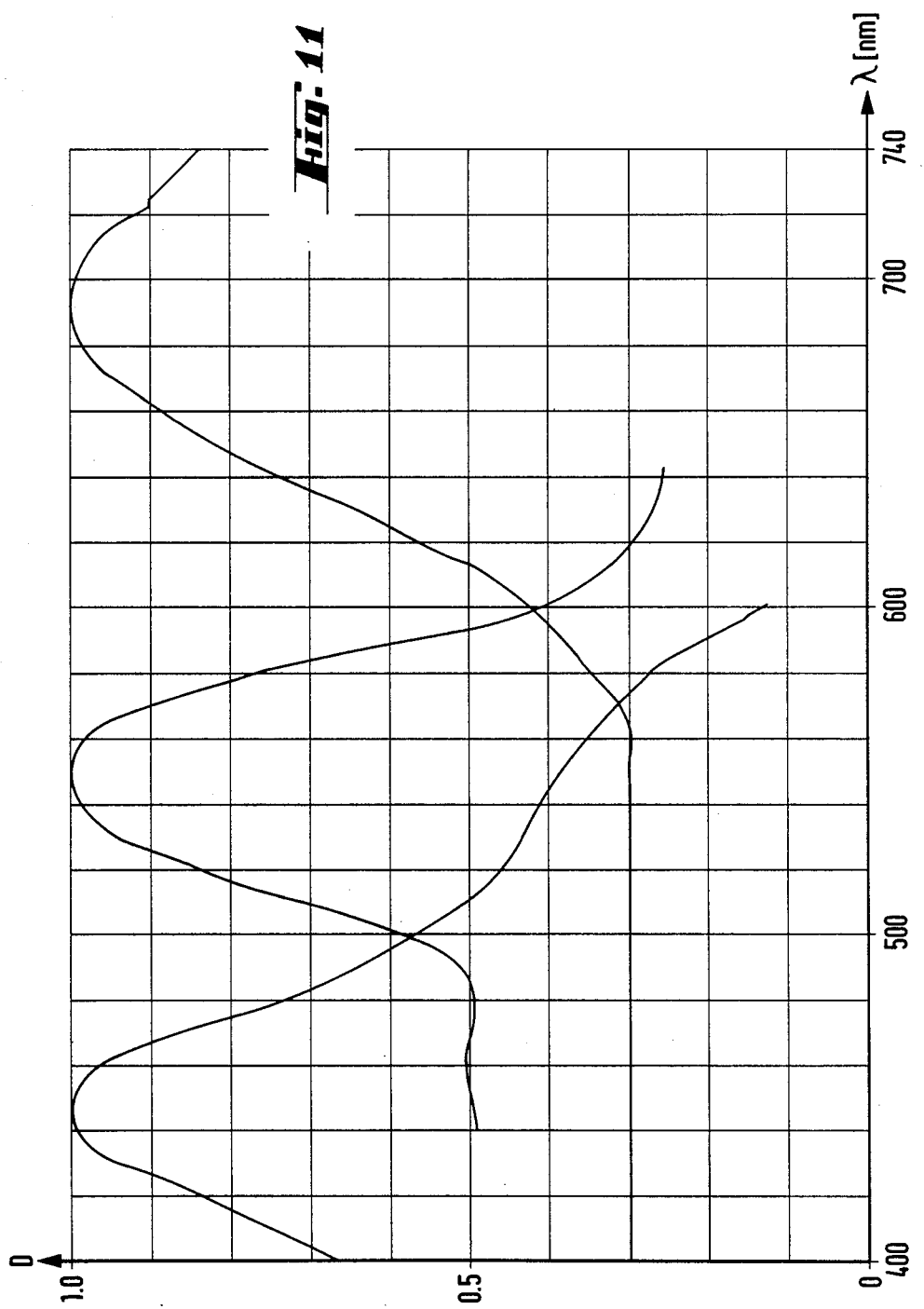

FIG. 10 shows that by means of the determination of upper envelope curve $Sup(\lambda)$, and by means of a plurality of measured density spectra $D^*(\lambda)$ standardized on the prevailing mask spectra, (i.e. the entirety of the measured maximum and standardized spectral density values $D^*_\lambda$), a curve is obtained which provides information concerning the properties of the actual absorption curves of the three colorants of the copy original. The spectral locations (wave lengths) of the points $R_1$, $R_2$, $B_1$, $B_2$, located for example by 0.3 density units under the prevailing maximum $M_R$, $M_B$ in the red and the blue range, respectively and the spectral locations of the points $G_1$, $G_2$ located for example by 0.1 density unit under the maximum $M_G$ in the green range, of this curve, together with the density values (height) of the three maxima $M_R$, $M_G$, $M_B$ themselves, may be used additionally by the mask spectrum as characteristics for the recognition of the type of film. In FIG. 11, the actual absorption curves (standardized on 1) of the same copy original are shown as a comparison. As is seen, the upper envelope curve and the actual curves are in very good agreement.

The recognition or distinction of different copy original manufactures can then be utilized in the usual manner, for example as described in U.S. Pat. No. 4,150,894 and the references cited therein, to further affect the control of the exposure.

It will be appreciated by those of ordinary skill in the art that the present invention can be embodied in other specific forms without departing from the spirit or essential characteristics thereof. The present disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for controlling the exposure in a photographic color copying apparatus, comprising the steps of:
 photoelectrically scanning a copy original by regions;
 determining for every scanned region of the original, color extract values adapted to the spectral sensitivity variation of a copy material;
 comparing the color extract values with corresponding reference values to determine the necessary amounts of copying light;
 said step of determining color extract values further including the steps of:
  decomposing measuring light which originates in each of the scanning regions of the copy original into a plurality of narrow spectral regions;
  measuring a spectral value for each spectral region; and,
  evaluating spectral sensitivity variations of the copy material and integrating the spectral values.

2. Process according to claim 1, wherein said color extract values are determined by weighting spectral sensitivity variations of the copy material and summing the spectral values.

3. Process according to claim 2, wherein the measurement of the spectral values is carried out in a coarser wave length grid with a lower resolution than is used in the evaluation and integration of the spectral values, and wherein intermediate spectral values which are not measured, are interpolated.

4. Process according to claim 3, wherein the measurement of the spectral values is effected with a resolution of 5 to 40 nanometers.

5. Process according to claim 4, wherein the measurement of the spectral values is effected with a resolution of 10 to 20 nanometers.

6. Process according to claim 5, wherein the evaluation of the spectral values is carried out by appropriately adjusting the sensitivity of the photoelectric measuring layout.

7. Process according to claim 6, wherein the measuring light originating in each of the scanning regions, is spectrally decomposed and projected onto a row of photosensors, wherein each photosensor is exposed to the light of another narrow wave length region.

8. Process according to claim 7, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

9. Process according to claim 8, wherein charged coupled devices (CCD) are used as the photoelectric sensors.

10. Process according to claim 9, wherein for the spectral decomposition of the measuring light a prism, a spectral filter or a diffraction grating is used.

11. Process according to claim 10, wherein the spectral values of a mask of the copy original are determined and included in an analysis of the original and the determination of the amounts of the copying light.

12. Process according to claim 10, wherein the spectral values of a mask of the copy original are determined and included in the determination of the amounts of the copying light.

13. Process according to claim 3, wherein the evaluation and integration of the spectral values and intermediate values are carried out with a resolution of 1 to 3 nanometers.

14. Process according to claim 13, wherein the evaluation and integration of the spectral values and intermediate values are carried out with a resolution of about 2 nanometers.

15. Process according to claim 14, wherein the evaluation of the spectral values is carried out by appropriately adjusting the sensitivity of the photoelectric measuring layout.

16. Process according to claim 15, wherein the measuring light originating in each of the scanning regions, is spectrally decomposed and projected onto a row of photosensors, wherein each photosensor is exposed to the light of another narrow wave length region.

17. Process according to claim 16, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

18. Process according to claim 17, wherein charged coupled devices (CCD) are used as the photoelectric sensors.

19. Process according to claim 18, wherein for the spectral decomposition of the measuring light a prism, a spectral filter or a diffraction grating is used.

20. Process according to claim 19, wherein the spectral values of a mask of the copy original are determined and included in an analysis of the original and the determination of the amounts of the copying light.

21. Process according to claim 19, wherein the spectral values of a mask of the copy original are determined and included in the determination of the amounts of the copying light.

22. Photographic color copying apparatus comprising:
   a projection device for reproducing a copy original on a photosensitive copy material;
   a measuring layout for photoelectrically scanning the original by regions and for determining for every scanning region, color extract values which are adapted to a spectral sensitivity variation of the copy material;
   exposure controls cooperating with the measuring layout and the projection device for determining amounts of copying light impacting the copy material, said measuring layout further including:
   spectrometric means for splitting measuring light which originates in every scanning region of the copy original into a plurality of narrow spectral regions and producing a spectral value for each spectral region; and
   electronic computer means for determining the color extract values upon which the exposure controls are based from the spectral values by evaluating the spectral sensitivity variation of the copy material and integrating said spectral values.

23. Photographic color copying apparatus according to claim 22, wherein the color extract values are determined by weighting the spectral sensitivity variations of the copy material and summing the spectral values.

24. Copying apparatus according to claim 23, wherein the spectrometric means comprise a prism, a spectral filter or a diffraction grating.

25. Copying apparatus according to claim 24, wherein the electronic means carries out the evaluation of the spectral values through the sensitivity of photosensors contained in the spectrometric means.

26. Copying apparatus according to claim 25, wherein the electronic computer means further includes a memory for storing the spectral sensitivity variations of the copy material and a computer for weighting the spectral values measured with the stored sensitivity values.

27. Copying apparatus according to claim 26, wherein the computer interpolates intermediate spectral values from the measured spectral values for use in the determination of the color extract values.

28. Copying apparatus according to claim 27, wherein the spectrometric means operates with a resolution of approximately 5 to about 40 nm.

29. Copying apparatus according to claim 28, wherein the spectrometric means operates with a resolution of about 10 to 20 nm.

30. Copying apparatus according to claim 29, wherein the spectrometric means contains a one- or two-dimensional field of sensors.

31. Copying apparatus according to claim 30, wherein the sensors are charge coupled photoelectric sensors.

32. Process for controlling the exposure in a photographic color copying apparatus comprising the steps of:
   photoelectrically scanning a copy original by individual regions;
   determining for each scanning region of the copy original, first color extract values adapted to spectral sensitivity variations of a copy material;
   comparing the first color extract values with appropriate reference values to determine the necessary amounts of copying light;
   determining for the individual scanning regions of the copy original, in additional to the first color extract values adapted to the copy material, second, separate color extract values adapted to spectral absorption variations of a copy original material of the copy original;
   analyzing the color composition of the individual scanning regions of the copy original using the second color extract values adapted to the copy original material and in keeping with predetermined criteria; and,
   determining in response to said analysis any effect of the first color extract values of the scanning regions in the determination of the amounts of copying light.

33. Process according to claim 32, further comprising the step of photoelectrically measuring the scanning regions of the original to obtain measured spectral values in the spectral regions in which the spectral absorption of the colorants of the copying original have their maximum for determining the second color extract values.

34. Process according to claim 33, further comprising the steps of:
   determining the transmissivity of density of a mask of the copying original and, in determining the second color extract values, standardizing the measured values on the transmissivity or density of the mask by dividing the values measured in the said spectral regions by the transmissivity of the mask in these spectral regions.

35. Process according to claim 34, wherein the individual scanning regions of the original are scanned spectrometrically and the first color extract values adapted to the copy material and/or the second color extract values are determined by the electronic or computer filtering of the spectral values obtained by the spectrometric scanning.

36. Process according to claim 35, wherein the spectral values, in particular those .of the mask in the case of negative films, are evaluated for recognizing the manufacture of the original.

37. Process according to claim 36, wherein the spectral values are standardized on the spectral transmissivity or density of the mask of the material of the original, and the evaluation to recognize the original material is carried out on the basis of the standardized spectral values.

38. Process according to claim 35, wherein said step of determining first color extract values further comprises the steps of:
decomposing measuring light which originates in each of the scanning regions of the copy original into a plurality of narrow spectral regions;
measuring a spectral value for each spectral region; and
evaluating spectral sensitivity variations of the copy material and integrating the spectral values.

39. Process according to claim 38, wherein said first extract values are determined by weighting spectral sensitivity variations of the copy material and summing the spectral values.

40. Process according to claim 39, wherein the measurement of the spectral values is carried out in a coarser wave length grid with a lower resolution than is used in the evaluation and integration of the spectral values, and wherein intermediate spectral values which are not measured, are interpolated.

41. Process according to claim 35, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

42. Process according to claim 34, wherein said step of determining first color extract values further comprises the steps of:
decomposing measuring light which originates in each of the scanning regions of the copy original into a plurality of narrow spectral regions;
measuring a spectral value for each spectral region; and
evaluating spectral sensitivity variations of the copy material and integrating the spectral values.

43. Process according to claim 42, wherein said first color extract values are determined by weighting spectral sensitivity variations of the copy material and summing the spectral values.

44. Process according to claim 43, wherein the measurement of the spectral values is carried out in a coarser wave length grid with a lower resolution than is used in the evaluation and integration of the spectral values, and wherein intermediate spectral values which are not measured, are interpolated.

45. Process according to claim 34, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

46. Process according to claim 33, further comprising the steps of:
determining the transmissivity or density of a mask of the copying original and, in determining the second color extract values, reducing the measured values by the density of the mask in said spectral regions.

47. Process according to claim 46, wherein the individual scanning regions of the original are scanned spectrometrically and the first color extract values adapted to the copy material and/or the second color extract values are determined by the electronic qr computer filtering of the spectral values obtained by the spectrometric scanning.

48. Process according to claim 47, wherein the spectral values, in particular those of the mask in the case of negative films, are evaluated for recognizing the manufacture of the original.

49. Process according to claim 48, wherein the. spectral values are standardized on the spectral transmissivity or density of the mask of the material of the original, and the evaluation to recognize the original material is carried out on the basis of the standardized spectral values.

50. Process according to claim 33, wherein said spectral regions are located at approximately 450 nm, 550 nm and 695 nm, each with a band width of about 10 nm.

51. Process according to claim 50, wherein the individual scanning regions of the original are scanned spectrometrically and the first color extract values adapted to the copy material and/or the second color extract values are determined by the electronic or computer filtering of the spectral values obtained by the spectrometric scanning.

52. Process according to claim 51, wherein the spectral values, in particular those of the mask in the case of negative films, are evaluated for recognizing the manufacture of the original.

53. Process according to claim 52, wherein the spectral values are standardized on the spectral transmissivity or density of the mask of the material of the original, and the evaluation to recognize the original material is carried out on the basis of the standardized spectral values.

54. Process according to claim 33, said step of determining first color extract values further comprises the steps of:
decomposing measuring light originates in each of the scanning regions of copy original into a plurality of narrow spectral regions;
measuring a spectral value for spectral region; and
evaluating spectral sensitivity variations of the copy material and integrating the spectral values.

55. Process according to claim 54, wherein said first extract values are determined by weighting spectral sensitivity variations of the copy material and summing the spectral values.

56. Process according to claim 55, wherein the measurement of the spectral values is carried out in a coarser wave length grid with a lower resolution than is used in the evaluation and integration of the spectral values, and wherein intermediate spectral values which are not measured, are interpolated.

57. Process according to claim 33, whereby in the photoelectric scanning of the copy original, a strip comprising a plurality of scanning regions of the copy original is always measured at any on time, such that measuring light originating in said strip is spectrally decomposed, and reproduced on a field of photosensors arranged in rows and columns, so that the photosensors belonging to one row are exposed to light from the same scanning region but having different wave length ranges.

58. Process according to claim 32, wherein said step of determining first color extract values further comprises the steps of:
   decomposing measuring light which originates in each of the scanning regions of the copy original into a plurality of narrow spectral regions;
   measuring a spectral value for each spectral region; and
   evaluating spectral sensitivity variations of the copy material and integrating the spectral values.

59. Process according to claim 58, wherein said first extract values are determined by weighting spectral sensitivity variations of the copy material and summing the spectral values.

60. Process according to claim 59, wherein the measurement of the spectral values is carried out in a coarser wave length grid with a lower resolution than is used in the evaluation and integration of the spectral values, and wherein intermediate spectral values which are not measured, are interpolated.

61. Process according to claim 32, whereby in the photoelectric scanning of the copy original, a strip comprising a plurality of scanning regions of the copy original is always measured at any one time, such that measuring light originating in said strip is spectrally decomposed, and reproduced on afield of photosensors arranged in rows and columns, so that the photosensors belonging to one row are exposed to light from the same scanning region but having different wave length ranges.

62. Photographic color copying apparatus comprising:
   a projection device for reproducing a copy original on photosensitive copy material;
   a measuring layout for photoelectrically scanning the original by regions, thereby determining for each scanning region, first color extract values adapted to the spectral sensitivity variations of the copy material;
   exposure controls cooperating with the measuring layout and the projection device for determining an amount of copying light impacting the copy material;
   said measuring layout further including:
      additional means for determining in addition to the first color extract values adapted to the copy material, second, separate color extract values adapted to spectral absorption variations of material of the copy original, for the individual scanning regions.

63. Copying apparatus according to claim 62, further comprising means for photoelectrically measuring the scanning regions of the original to obtain measured spectral values in the spectral regions in which the spectral absorption of the colorants of the copying original have their maximum for determining the second color extract values.

64. Copying apparatus according to claim 63, further comprising means for determining the transmissivity of density of a mask of the copying original and, in determining the second color extract values, standardizing the measured values on the transmissivity or density of the mask by dividing the values measured in the said spectral regions by the transmissivity of the mask in these spectral regions.

65. Copying apparatus according to claim 64, wherein the individual scanning regions of the original are scanned spectrometrically and the first color extract values adapted to the copy material and/or the second color extract values are determined by the electronic or computer filtering of the spectral values obtained by the spectrometric scanning.

66. Copying apparatus according to claim 65, wherein the spectral values, in particular those of the mask in the case of negative films, are evaluated for recognizing the manufacture of the original.

67. Copying apparatus according to claim 66, wherein the spectral values are standardized on the spectral transmissivity or density of the mask of the material of the original, and the evaluation to recognize the original material is carried out on the basis of the standardized spectral values.

68. Copying apparatus according to claim 64, wherein said measuring layout for determining first color extract values decomposes measuring light which originates in each of the scanning regions of the copy original into a plurality of narrow spectral regions; measures a spectral value for each spectral region; and evaluates spectral sensitivity variations of the copy material and integrates the spectral values.

69. Copying apparatus according to claim 68, wherein said first color extract values are determined by weighting spectral sensitivity variations of the copy material and summing the spectral values.

70. Copying apparatus according to claim 69, wherein the measurement of the spectral values is carried out in a coarser wave length grid with a lower resolution than is used in the evaluation and integration of the spectral values, and wherein intermediate spectral values which are not measured are interpolated.

71. Copying apparatus according to claim 65, wherein said measuring layout for determining first color extract values decomposes measuring light which originates in each of the scanning regions of the copy original into a plurality of narrow spectral regions; measures a spectral value for each spectral region; and evaluates spectral sensitivity variations of the copy material and integrates the spectral values.

72. Copying apparatus according to claim 71, wherein said first extract values are determined by weighting spectral sensitivity variations of the copy material and summing the spectral values.

73. Copying apparatus according to claim 72, wherein the measurement of the spectral values is carried out in a coarser wave length grid with a lower resolution than is used in the evaluation and integration of the spectral values, and wherein intermediate spectral values which are not measured are interpolated.

74. Copying apparatus according to claim 65, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

75. Copying apparatus according to claim 64, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

76. Copying apparatus according to claim 63, further comprising means means for determining the transmissivity or density of a mask of the copying original and, in determining the second color extract values, reducing the measured values by the density of the mask in said spectral regions.

77. Copying apparatus according to claim 76, wherein the individual scanning regions of the original are scanned spectrometrically and the first color extract values adapted to the copy material and/or the second color extract values are determined by the electronic or computer filtering of the spectral values obtained by the spectrometric scanning.

78. Copying apparatus according to claim 77, wherein the spectral values, in particular those of the mask in the case of negative films, are evaluated for recognizing the manufacture of the original.

79. Copying apparatus according to claim 78, wherein the spectral values are standardized on the spectral transmissivity or density of the mask of the material of the original, and the evaluation to recognize the original material is carried out on the basis of the standardized spectral values.

80. Copying apparatus according to claim 63, wherein said spectral regions are located at approximately 450 nm, 550 nm and 695 nm, each with a band width of about 10 nm.

81. Copying apparatus according to claim 80, wherein the individual scanning regions of the original are scanned spectrometrically and the first color extract values adapted to the copy material and/or the second color extract values are determined by the electronic or computer filtering of the spectral values obtained by the spectrometric scanning.

82. Copying apparatus according to claim 81, wherein the spectral values, in particular those of the mask in the case of negative films, are evaluated for recognizing the manufacture of the original.

83. Copying apparatus according to claim 82, wherein the spectral values are standardized on the spectral transmissivity or density of the mask of the material of the original, and the evaluation to recognize the original material is carried out on the basis of the standardized spectral values.

84. Copying apparatus according to claim 63, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

85. Copying apparatus according to claim 62, wherein said measuring layout for determining first color extract values decomposes measuring light which originates in each of the scanning regions of the copy original into a plurality of narrow spectral regions; measures a spectral value for each spectral region; and evaluates spectral sensitivity variations of the copy material and integrates the spectral values.

86. Copying apparatus according to claim 85, wherein said first extract values are determined by weighting spectral sensitivity variations of the copy material and summing the spectral values.

87. Copying apparatus according to claim 86, wherein the measurement of the spectral values is carried out in a coarser wave length grid with a lower resolution than is used in the evaluation and integration of the spectral values, and wherein intermediate spectral values which are not measured are interpolated.

88. Copying apparatus according to claim 62, wherein said measuring layout for determining first color extract values decomposes measuring light which originates in each of the scanning regions of the copy original into a plurality of narrow spectral regions; measures a spectral value for each spectral region; and evaluates spectral sensitivity variations of the copy material and integrates the spectral values.

89. Copying apparatus according to claim 88, wherein said first extract values are determined by weighting spectral sensitivity variations of the copy material and summing the spectral values.

90. Copying apparatus according to claim 89, wherein the measurement of the spectral values is carried out in a coarser wave length grid with a lower resolution than is used in the evaluation and integration of the spectral values, and wherein intermediate spectral values which are not measured, are interpolated.

91. Copying apparatus according to claim 62, whereby in the photoelectric scanning of the copy original, a strip comprising a plurality of scanning regions of the copy original is always measured at any one time, such that measuring light originating in said strip is spectrally decomposed, and reproduced on a field of photosensors arranged in rows and columns, so that the photosensors belonging to one row are exposed to light from the same scanning region but having different wave length ranges.

* * * * *